Feb. 16, 1926.
A. E. PENFOLD
MANUFACTURE OF GOLF BALLS
Filed Nov. 26, 1923
1,573,271
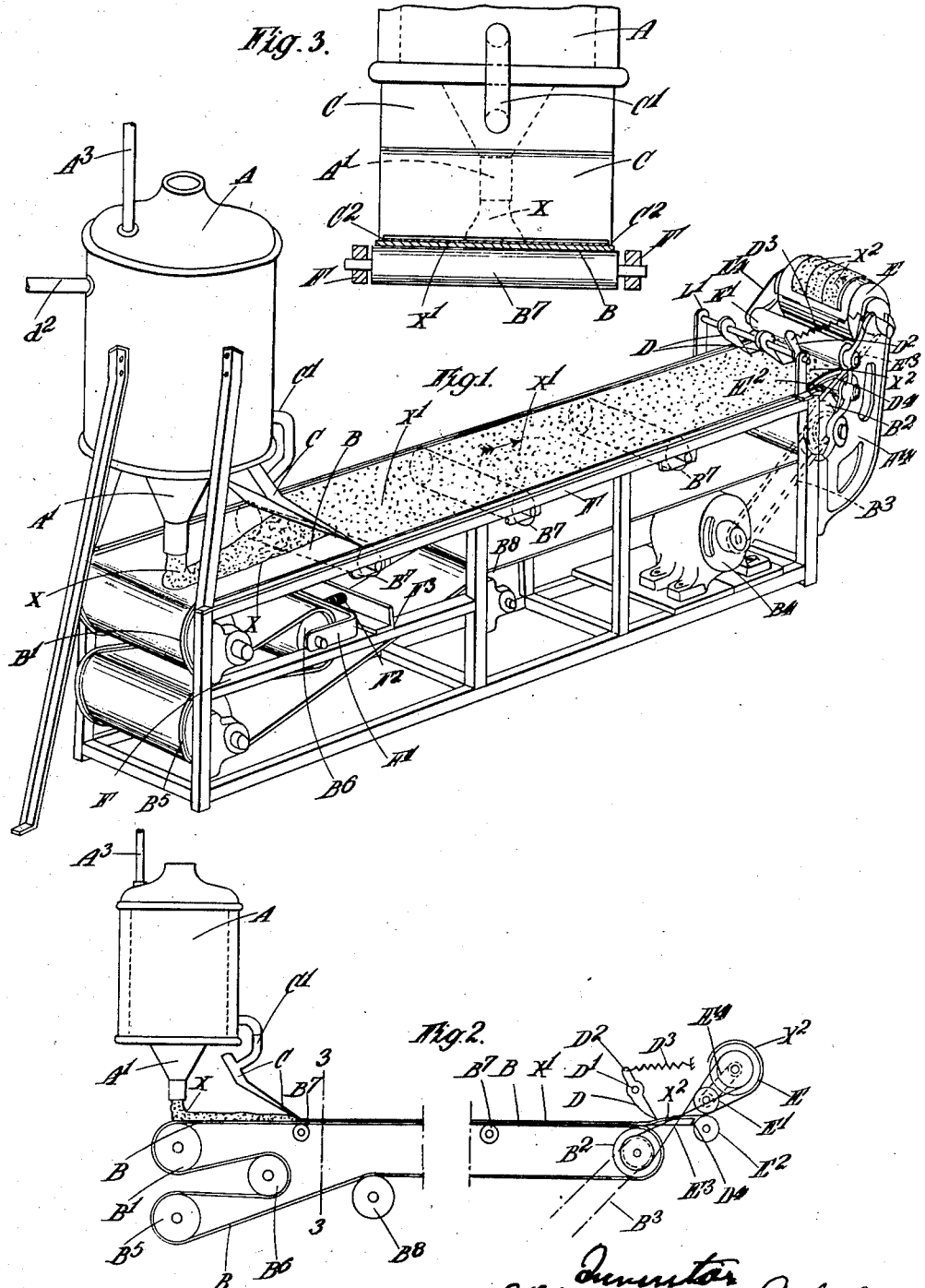

Patented Feb. 16, 1926.

1,573,271

UNITED STATES PATENT OFFICE.

ALBERT ERNEST PENFOLD, OF BIRMINGHAM, ENGLAND, ASSIGNOR TO THE DUNLOP RUBBER COMPANY, LIMITED, OF LONDON, ENGLAND, A BRITISH COMPANY.

MANUFACTURE OF GOLF BALLS.

Application filed November 26, 1923. Serial No. 677,075.

*To all whom it may concern:*

Be it known that I, ALBERT ERNEST PENFOLD, a subject of the King of Great Britain, residing at Manor Mills, Salford Street, Aston, Birmingham, in the county of Warwick, England, have invented certain new and useful Improvements in or Relating to the Manufacture of Golf Balls, of which the following is a specification.

This invention relates to the manufacture of golf balls and has particular reference to the manufacture or formation of the outer covers or shells, which are generally made of gutta-percha or balata with or without the addition of india-rubber. The outer covers or shells have been made by winding a calendered tape or strip of gutta-percha around the golf ball core, the covering formed by the wound tape or strip being subsequently moulded. The working and mechanical treatment of the gutta-percha to form the tape or strip detrimentally affect the gutta-percha with the result that the cover or shell formed by the wound strip does not possess the original characteristics or properties of the gutta-percha which are very essential for the production of a satisfactory cover or shell. The object of the present invention is to produce the tapes or strips in such manner that the original nerve and general characteristics of the gutta-percha or similar material are retained so that after the tape or strip has been wound on the core and subsequently moulded, a satisfactory outer cover having the original properties of the gutta-percha is produced.

In accordance with the present invention and with the above stated object in view, the tape or strip for forming the outer cover of the golf ball is produced or formed from a solution of gutta-percha or balata or a solution of gutta-percha and/or balata and india-rubber (hereinafter referred to as gutta-percha or gutta-percha solution). The gutta-percha is dissolved by a suitable solvent with the application of heat to produce the solution from which tapes or strips are to be formed. By preparing a solution of gutta-percha, the original nerve of the latter is in no way destroyed or detrimentally affected, and the tapes or strips may be formed from the solution in various ways without involving mechanical or other treatment which would detrimentally affect the gutta-percha. One convenient method of forming the tape or strip is to spread the solution into a very thin layer on a flat surface, the thin layer so formed being allowed to solidify by cooling or by evaporation of the solvent. The thin layer of the solution may after solidification be cut into tapes or strips of the desired width for winding on the golf ball core, but the solution may be spread directly into strip or tape form of the desired width so as to avoid the cutting operation. Generally the spreading of the solution may be effected by causing it to pass through a flat opening formed between two suitable surfaces which impart the desired thickness to the layer as required in the finished tape or strip. For example the solution may be supplied on to a flat surface and passed under a spreader the edge of which is maintained in close proximity to the said flat surface. The width of the spreader and the said flat surface may be such as to produce a sheet or a wide thin layer of the solution which after solidification is cut into tapes or strips of the desired width, the tapes or strips so formed being batched up or wound on to a roller ready for use.

The gutta-percha tape or strip formed as hereinbefore referred to may be wound on the golf ball core to produce a wound covering which is subsequently moulded to complete the manufacture of the outer cover or shell which possesses the original nerve of the gutta-percha.

In order that the invention may be more clearly understood and readily carried into effect the same will now be described more fully with reference to the accompanying drawings, in which:—

Figure 1 is a perspective view of one construction of apparatus for producing the gutta-percha strips or tapes according to this invention.

Figure 2 is a diagrammatic side view of the apparatus.

Figure 3 is a sectional view taken approximately on the line 3—3 of Figure 2.

A is a tank or vessel containing the gutta-percha solution which is prepared in any suitable or usual manner. B is an endless belt or band conveyor on which the solution from the tank is supplied through an outlet pipe or nozzle A[1] at the bottom of the tank A. C is a spreader extending across the belt for flattening or spreading the mass of solution indicated by X into a thin sheet or layer indicated by $X^1$. D, D represent knives or cutters for dividing the layer or sheet of solution into strips or tapes indicated by $X^2$. E represents the roller on to which the strips or tapes $X^2$ are wound or batched up. The tank A is provided with a water jacket to which hot water can be supplied through a pipe $A^2$ for maintaining the solution in the tank at the desired temperature. The solution is preferably forced through the outlet pipe $A^1$ on to the conveyor B by compressed air admitted to the upper part of the tank through a pipe $A^3$. The conveyor belt or band B which is preferably provided with a smooth polished surface passes around rollers $B^1$, $B^2$ rotatably mounted in the main frame F of the apparatus, the roller $B^2$ being driven by chain gearing $B^3$ from an electric motor $B^4$ positioned within the frame F as shown in Figure 1. The conveyor B also passes around rollers $B^5$, $B^6$ rotatably mounted in the frame F in the positions shown and the roller $B^6$ is carried on an adjustable support $F^1$ slidably mounted on a suitable part of the frame and connected by a screw or screws $F^2$ to a fixed member $F^3$ so that by manipulating the screws $F^2$ the support $F^1$ with its roller $B^6$ can be slidably moved to tension the conveyor B as required. A number of supporting rollers $B^7$ may be rotatably mounted in the upper part of the frame F for supporting the belt as it passes from the roller $B^1$ to the driving roller $B^2$ whilst a lower supporting roller $B^8$ is provided for supporting the belt as it passes from the said driving roller $B^2$ to the roller $B^5$. Instead of providing the supporting rollers $B^7$ a table or flat support may be fixed in the frame F for supporting the said belt or band B between the rollers $B^1$ and $B^2$. The tank A is so positioned that the solution forced through the outlet $A^1$ falls on to the conveyor band as the latter passes round and leaves the roller $B^1$ and the mass of solution X deposited on the conveyor is carried towards the spreader C which in the example shown is in the form of a hollow metal casing supported on the lower part of the tank A. The lower part of the spreader is formed with a thin edge extending across practically the whole width of the conveyor and disposed above the first of the supporting rollers $B^7$ in close proximity to the upper surface of the conveyor the distance between the thin edge of the spreader and the conveyor determining the thickness of the spread layer or sheet $X^1$. The interior of the hollow spreader is in communication with the hot water jacket of the tank A through a pipe $C^1$ so that the spreader can be heated by the hot water from the jacket in order to facilitate the spreading of the gutta-percha solution into the thin layer $X^1$. The first supporting roller $B^7$ affords positive support for the conveyor B at the point where actual spreading of the solution is effected and in the case of a supporting table being used instead of the rollers $B^7$ it would extend under the spreader in order to afford the necessary support at the spreading position. The distance between the spreader edge and the conveyor is only very slight so that as the mass of solution indicated by X passes under the spreader edge it is flattened into the thin layer or sheet $X^1$ extending across practically the whole width of the band on which the thin layer $X^1$ solidifies whilst being carried towards the knives or cutters D. If desired the sides of the spreader C may be provided with flanges or depending cheeks $C^2$ (see Figure 3) to determine the width of the layer of the solution that is spread on to the band. Alternatively the band itself may be provided with flanges for this purpose. The knives or cutters D are laterally adjustable on a shaft $D^1$ having an arm $D^2$ to which a tension spring $D^3$ extending from the end part $F^4$ of the main frame is connected so as to maintain the ends of the knives or cutters in contact with a scraper blade $D^4$ having a thin edge which is located close against the outer surface of the conveyor B where the latter passes round the driving roller $B^2$ so as to prevent the solidified layer $X^1$ from being carried round the driving roller $B^2$ and ensure its travel over the upper surface of the scraper blade $D^4$ on which the actual cutting or dividing of the layer $X^1$ into the strips $X^2$ is effected. By adjusting the knives D on the shaft $D^1$ the layer can be cut into strips or tapes of different widths. The strips or tapes $X^2$ pass between a pair of nipping rollers $E^1$, $E^2$ supported in the frame part $F^4$ and on emerging from between these rollers the strips $X^2$ are wound on to the batching-up roller E which is detachably mounted in suitable supports on the frame part $F^4$ so that the batching up roller E with the strips or tapes $X^2$ wound thereon can be readily removed, the batched up strips being ready for use by unwinding from the roller E as required. In the example shown the batching up roller is driven by a cross belt $E^3$ from a pulley on the driving roller $B^2$ and the upper nipping roller $E^1$ may be driven by a belt $E^4$ from the batching up roller E as diagrammatically represented in Figures 1 and 2. Instead of cutting or dividing the layer of solidified solution into narrow strips or tapes prior to the batching up operation the cutting or dividing may be effected after or during the batching up operation.

No claim is herein made to the ball as an article of manufacture produced by the method hereinbefore described, as claims therefor are presented in a divisional application, Serial No. 46,464, filed July 27, 1925.

What I claim and desire to secure by Letters Patent of the United States is:—

1. In the manufacture of golf balls, a method of preparing gutta percha for use in the construction of the ball, comprising preparing a solution of gutta percha, and forming the solution into a thin layer.

2. In the manufacture of golf balls, a method of preparing gutta percha for the outer cover, comprising preparing a solution of gutta percha, spreading the solution to form a thin layer, and cutting said layer into narrow strips.

3. In the manufacture of golf balls, a method of treating gutta percha for the outer cover, comprising preparing a solution of gutta percha, spreading the solution into a thin layer, and dividing said layer after solidification into a number of strips.

4. In the manufacture of golf balls, a method of preparing gutta percha for the outer cover, comprising preparing a solution of the gutta percha, spreading the solution into a thin layer on a travelling surface, and cutting said thin layer at a point remote from the spreading point into strips.

5. In the manufacture of golf balls, a method of preparing gutta percha for the outer cover, comprising supplying gutta percha solution to a travelling surface, passing the deposited solution under a spreader to produce a thin layer on said surface, removing said layer from said surface, and cutting the layer as it is removed into a number of strips.

6. In the manufacture of golf balls, a method of preparing gutta percha for the outer cover, comprising preparing a solution of gutta percha, maintaining the solution at the desired temperature, causing said solution to be deposited on a travelling band, subjecting the solution on the band to the action of a heated spreader to form a thin layer, carrying said thin layer to a point remote from the spreader so that the layer solidifies, removing said layer from the travelling band, cutting said layer as it is removed from the band into strips, and winding said strips as they are cut onto batching up means.

7. As an article of manufacture, a strip for use in the manufacture of golf balls prepared from gutta percha solution.

8. As an article of manufacture, a strip for use in the manufacture of golf balls prepared by spreading gutta percha solution into a thin layer.

9. As an article of manufacture, a strip for winding on golf ball cores prepared by spreading gutta percha solution into a thin layer, and cutting said layer into narrow lengths.

ALBERT ERNEST PENFOLD.